(12) United States Patent
Noordanus et al.

(10) Patent No.: US 8,528,595 B2
(45) Date of Patent: Sep. 10, 2013

(54) DISTRIBUTOR WITH A ROTATABLE U-SHAPED CONNECTION CHANNEL

(75) Inventors: Maximiliaan Noordanus, Noord Scharwoude (NL); Eric Michael Cornelis Maria van Eijnatten, Obdam (NL)

(73) Assignee: Bravilor Holding B.V., (NL)

( * ) Notice: Subject to any disclaimer, the term of this patent is extended or adjusted under 35 U.S.C. 154(b) by 329 days.

(21) Appl. No.: 12/991,406

(22) PCT Filed: May 5, 2009

(86) PCT No.: PCT/NL2009/050240
§ 371 (c)(1),
(2), (4) Date: Nov. 5, 2010

(87) PCT Pub. No.: WO2009/136785
PCT Pub. Date: Nov. 12, 2009

(65) Prior Publication Data
US 2011/0056576 A1    Mar. 10, 2011

(30) Foreign Application Priority Data

May 6, 2008 (NL) ........................................ 2001560

(51) Int. Cl.
*F16K 11/074* (2006.01)
*F16K 24/00* (2006.01)
*F16K 31/53* (2006.01)
(52) U.S. Cl.
USPC .................... 137/625.11; 137/216; 251/129.1; 251/249.5

(58) Field of Classification Search
USPC ............ 137/216, 625.11; 251/129.11, 249.5
See application file for complete search history.

(56) References Cited

U.S. PATENT DOCUMENTS

| 758,188 | A | * | 4/1904 | Miller ........................... 137/216 |
| 825,370 | A | * | 7/1906 | Zurbuch ................... 137/625.11 |
| 2,979,963 | A | | 4/1961 | Snoy |
| 3,076,478 | A | * | 2/1963 | Winders .................... 137/625.11 |
| 3,520,327 | A | * | 7/1970 | Abbott et al. ............ 137/625.11 |
| 3,633,621 | A | | 1/1972 | Myers |
| 4,156,437 | A | | 5/1979 | Chivens et al. |
| 4,253,494 | A | * | 3/1981 | Cooke ...................... 137/625.15 |
| 4,366,839 | A | * | 1/1983 | Slavin ...................... 137/625.11 |
| 4,410,001 | A | * | 10/1983 | Goguen ................... 137/625.11 |
| 5,046,522 | A | * | 9/1991 | Le Devehat et al. ..... 137/625.11 |
| 5,927,330 | A | * | 7/1999 | Minton et al. ........... 137/625.11 |
| 7,059,341 | B2 | * | 6/2006 | Kumar et al. ................. 137/216 |
| 7,100,623 | B2 | * | 9/2006 | Assmann et al. ........ 137/625.11 |

* cited by examiner

*Primary Examiner* — John Rivell
(74) *Attorney, Agent, or Firm* — Fliesler Meyer LLP

(57) ABSTRACT

Distributor (5) with at least two discharge channels (10,16) which are positioned at the same distance from a central axis (13), parallel to this axis, a supply channel (11) and a distributor member (12,17,18) which is rotatable about the axis and has a supply end (12') positioned along the axis and a discharge end (12") which is set radially apart therefrom and can be brought by rotation of the distributor member selectively into fluid connection with the respective discharge channels, characterized in that the liquid supply channel extends along the central axis and along the discharge channels, the distributor member comprising a U-shaped connection channel which is placed at the supply end rotatably in the extension of the supply channel and can be placed at the discharge end in fluid connection with the respective discharge channels.

3 Claims, 3 Drawing Sheets

DISTRIBUTOR WITH A ROTATABLE U-SHAPED CONNECTION CHANNEL

The invention relates to a distributor with at least two discharge channels which are positioned at the same distance from a central axis, parallel to this axis, a supply channel and a distributor member which is rotatable about the axis and has a supply end positioned along the axis and a discharge end which is set radially apart therefrom and can be brought by rotation of the distributor member selectively into fluid connection with the respective discharge channels, the liquid supply channel extending along the central axis and along the discharge channels, the distributor member comprising a U-shaped connection channel which is placed at the supply end rotatably in the extension of the supply channel and can be placed at the discharge end in fluid connection with the respective discharge channels.

In a device of this type, water is for example supplied from a water reservoir to a heating device from which the warm water is supplied to the distributor. Via the distributor, the warm water is supplied to a user and/or to one or more drink preparation devices. This is for example described in NL 6000164 and NL 6000166.

EP 1245013 and P 0811345 describe systems which operate on the basis of gravity and which dispense a fixed amount of liquid. A system of this type is not suitable for dispensing variable amounts of liquid, such as water. Furthermore, the known systems allow merely a limited volume of liquid to be dispensed per unit of time.

Another drawback of the known systems is the fact that the various parts must be placed at all times in a more or less fixed position with respect to one another. This necessitates the reservation in an apparatus, at all times with less freedom, of a fixed space in order to be able to use the system; this means restrictions in the possibilities for the design of the apparatus. Above all in apparatuses for which one of the requirements is that they are both able to dispense a relatively small amount of drink or water (0.1 to 0.2 liter) and are able to rapidly dispense approx. 1.8 liters, a jug, the restrictions are a handicap. In this case, it is often also necessary for the apparatus to be as compact (small) as possible and in many cases dispensing apparatuses of this type are expected to be able to make a multiplicity of drinks from a plurality of ingredients. The combination of requirements, dispensing of approx. 0.15 liter to approx. 1.8 liters in a relatively short time of 10 to 90 sec, of a plurality of drinks made of water and various ingredients and a very compact design, means that the reservoir and the system have to be sufficiently large, but have to be assembled in a very compact manner, all space in the apparatus being utilized as effectively as possible.

A distributor according to the preamble of Claim 1 is known from U.S. Pat. No. 3,633,621. The known pneumatic switch can selectively connect a plurality of discharge channels to a central discharge channel through a rotatable U-shaped connection channel. In this case, the switching between the liquid channels takes place by manually turning a knob connected to the connection channel. The known device does not provide precise driving by means of an electric motor and it is not clear how the device can be obtained in a space-saving manner.

It is therefore an object of the invention to provide a distributor with which liquids can be supplied at a relatively high flow rate to various drink preparation devices and/or users. It is furthermore an object to provide a distributor having relatively small dimensions.

It is also an object of the invention to provide a distributor with which amounts of water can be supplied to various drink preparation devices and/or users automatically and in a precise manner.

For this purpose, a distributor according to the invention is characterized in that the U-shaped connection channel is fastened to a cylindrical drive wall having a longitudinal axis lying in the extension of the central axis, which drive wall is provided along an upper side with teeth which act on a drive member for rotation of the U-shaped connection channel.

As a result of the fact that the supply channel extends along the discharge channels, the dimensions of the distributor remain limited. As a result of the U shape of the connection channel, the liquid is diverted even at relatively high speeds and in the direction away from the supply channel toward the discharge channels, without the liquid being able to flow or splash over the edge of the discharge channels. As a result, relatively high liquid flow rates can be supplied through the distributor to one of a multiplicity of discharge channels.

As a result of the fact that the U-shaped connection channel is fastened to a cylindrical drive wall having a longitudinal axis lying in the extension of the central axis, which drive wall is provided along an upper side with teeth which act on a drive member for rotation of the U-shaped connection channel, the lateral dimensions of the distributor can remain small as a result of the teeth on the upper side of the drive wall. The drive member can comprise a worm wheel which is driven by an electric motor and which acts on the vertically directed teeth of the drive wall in order to drive the drive wall in rotation.

The U-shaped connection channel can be provided in proximity to an upper side with a ventilation channel extending through a circumferential wall of the channel in the direction of flow into the U-shaped connection channel. The inflowing water can pass along the ventilation channel, which extends partly in the direction of flow in the connection channel, while rising air or steam can collect on the upper side of the U-shaped connection channel and be discharged to a ventilation device or to the environment via the ventilation opening.

In a further embodiment, the U-shaped connection channel is provided in proximity to an upper side with an annular bearing wall which extends around the ventilation opening in the outer wall of the U-shaped connection channel and which acts on a cam which reaches into the wall on or protrudes into an opening in a covering cap of the distributor. As a result of the bearing wall, the U-shaped connection channel is rotatably mounted between on the one hand the supply channel and on the other hand a covering cap of the distributor. On an underside, the U-shaped connection channel can be provided with an annular bearing wall having a shoulder which falls in a slot around the supply channel, the shoulder resting on an end face of the supply channel. This provides a simple, liquid-tight, rotatable connection of the connection channel to the supply channel.

A few embodiments of a distributor according to the invention will be described in greater detail by way of example with reference to the appended drawings, in which.

Figure 1:
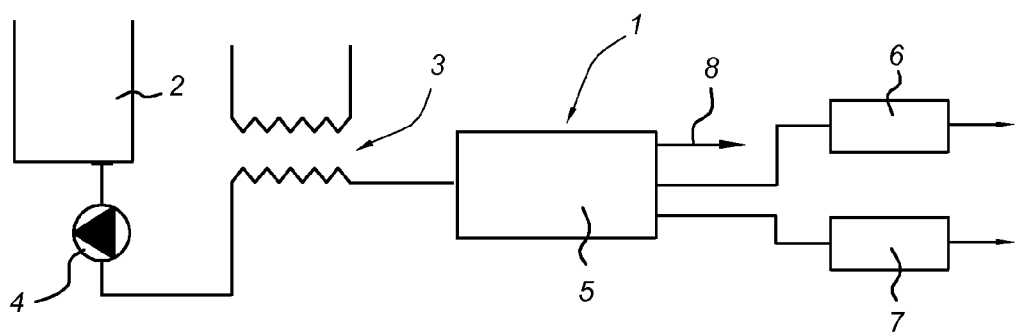
FIG. 1 is a schematic representation of a drink dispensing device wherein the distributor according to the invention can be applied.

FIG. 1 shows a drink dispensing system 1, for example a coffee machine, with a water reservoir 2, a heat exchanger 3, a pump 4, a distributor 5 and drink preparation devices 6 and 7. From the water reservoir 2, the water is supplied, after having been heated to a temperature of for example 80° C. in the heat exchanger 3, to an inlet of the distributor 5 by the pump 4. The flow rate can in this case be between 0.1 and 0.2 liter per minute, and is directly dispensed to a user via an outlet 8 or to one of the drink preparation devices 6, 7, for example for making coffee, or another warm drink such as soup. The flow rate can also be approx. 1.8 l per minute or more for dispensing an amount of warm water to a jug via outlet 8. This higher flow rate can, if desired, also be supplied to the drink preparation devices 6, 7.

Figure 2:
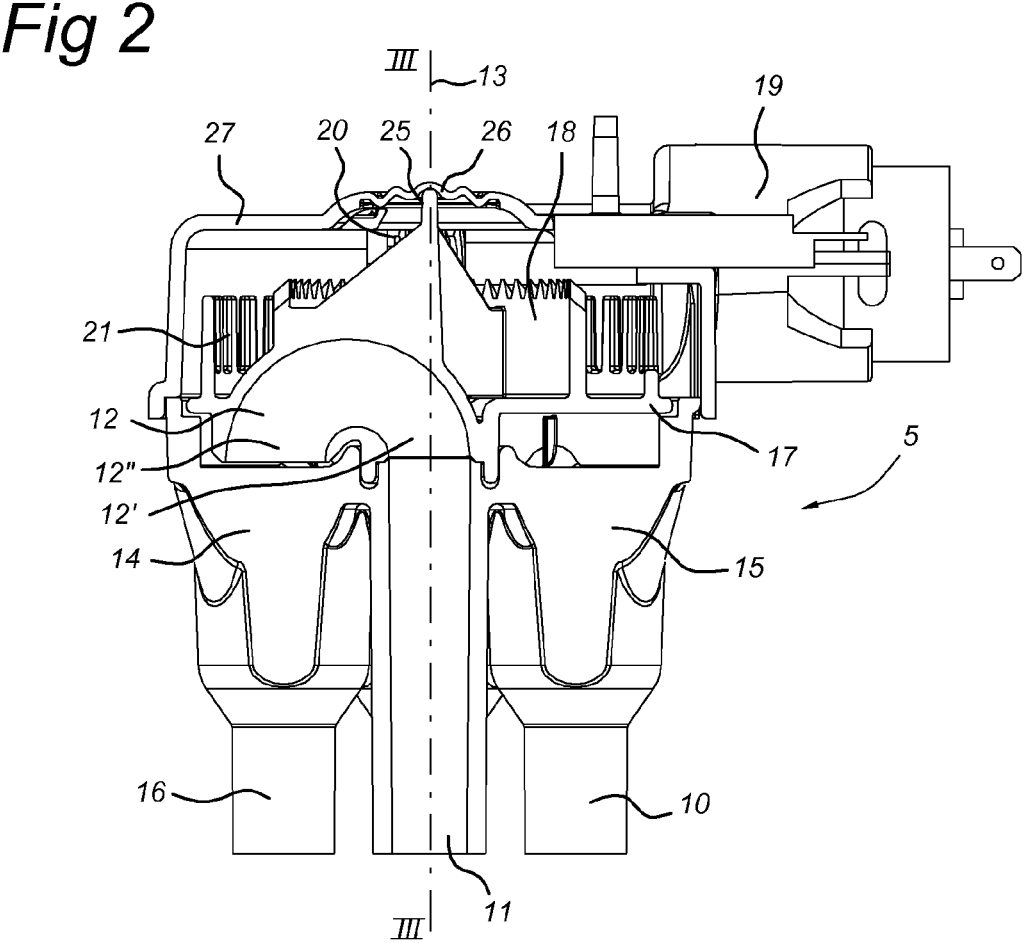
FIG. 2 is a cross section through a distributor according to the invention along a vertical line II-II.

The distributor 5, as is shown in FIG. 2, has a centrally placed, downwardly directed inlet 11 through which the liquid, the water, enters the distributor from below.

Attached adjoining the central inlet 11 is a tubular guide 12 which runs in an inverted U. One of the legs of the U adjoins the inlet 1; the other leg can be rotated around the central axis 13 to above one of the outflows 14, 15 of the discharge channels 10, 16 of the distributor. The distributor can have two to for example six discharge channels which are arranged in a circular shape with the inlet 11 as the centre point.

The U-shaped guide 12 is fastened to a plate 17 having thereon a toothed rim 18 which, together with a worm wheel 20 driven by a motor 19, ensures the rotation. Furthermore, a detector rim 21 is attached to the plate 17, as a result of which the plate 17, and thus the outflow of the U-shaped guide 12, can be positioned exactly above an outflow 14, 15 via a detector and the electronic controller of the motor 19.

Via a cam 25, the plate 17 is rotatably supported in a cavity 26 of the covering cap 27. This cavity 26 is, as a result of its design, arranged somewhat resiliently in the covering 27. Present around the cavity 26 are openings (which cannot be seen in the figure) along which steam and air can escape. For this purpose, a ventilation opening can be formed in the U-shaped guide 12.

Figure 3:
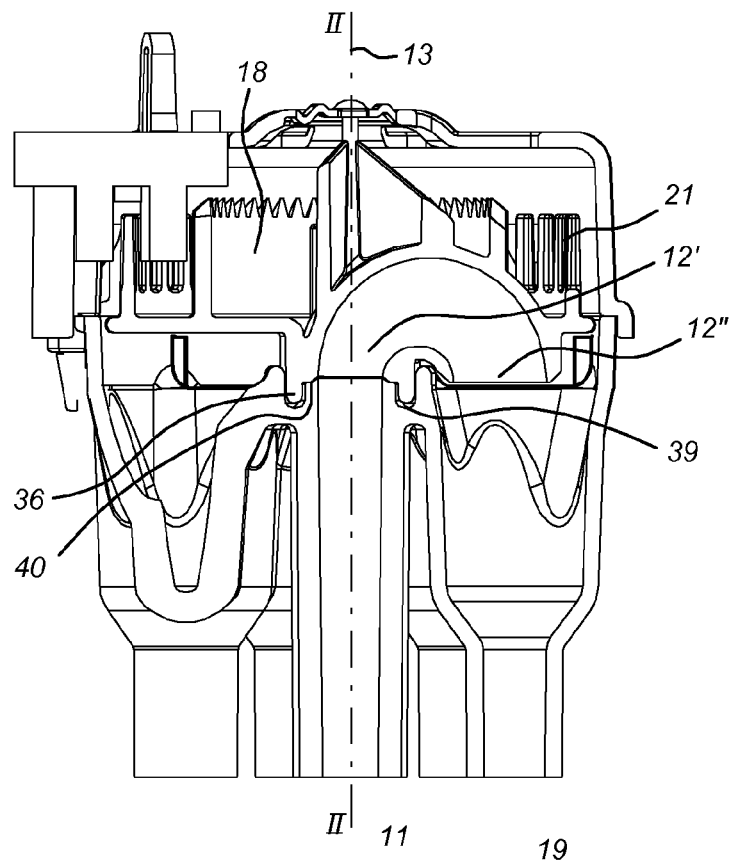
FIG. 3 is a cross section through the distributor according to FIG. 2 along the line III-III.
Figure 4:
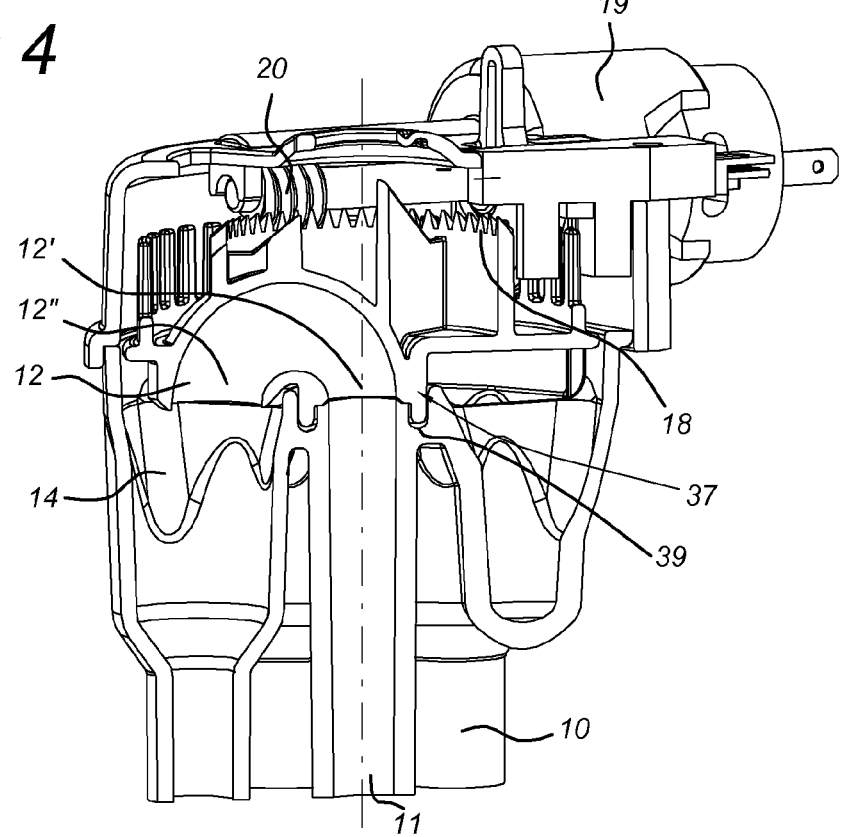
FIG. 4 is a perspective view of a distributor according to FIG. 2 and FIG. 3.
Figure 5:
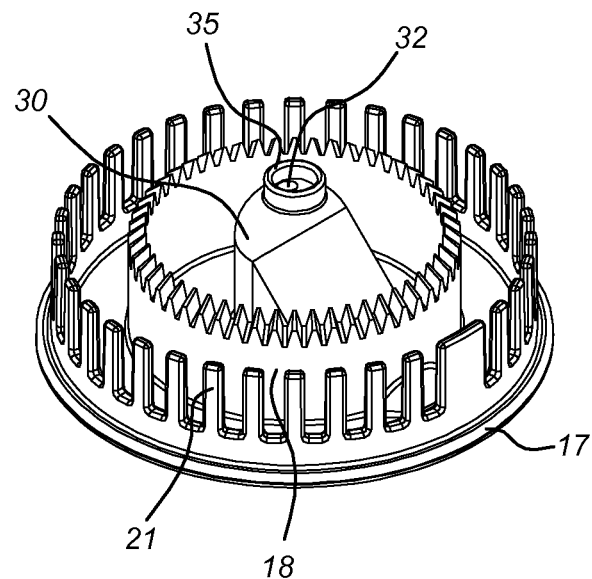
FIG. 5 is a perspective view of a distributor disc with the U-shaped connection channel, a drive wall, teeth and a ventilation opening.
Figure 6:
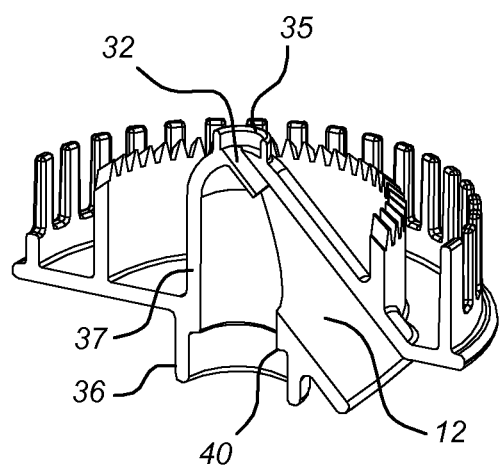
FIG. 6 is a cross section through the distributor disc according to FIG. 5.

In FIG. 5 and FIG. 6, (an embodiment is shown wherein) there is formed on the upper side of the bend 30 in the U-shaped guide 12 a ventilation opening 32 which is embodied in such a way that the water does not flow therein as it flows along. This is readily possible by forming the ventilation in such a way that the water as it flows along passes therealong and therearound as a result of the inertia of the movement, but the air which is present does escape. The channel of the ventilation 32 can also advantageously be applied in the embodiment according to FIG. 2-4.

Air and steam can also escape through the spaces and cracks between the round outflow of the U-shaped guide and the outflows of the distributor device. The latter have on the side of the guide the shape of an angular trapezium (sectors of a circular shape); further away from there, they change over to a round shape which is funnel-shaped in the direction of the longitudinal axis. Hoses, which guide the liquid to the users, drink preparation devices, or via an outflow directly out of the apparatus, are connected to the discharge channels 10, 16.

The rotating disc 17 containing therein the U-shaped guide 12 has, in the embodiment according to FIG. 5 and FIG. 6, a pivot point/bearing in the form of an edge 36 on the central leg 37 of the U shape which falls in a groove 39 on the upper side of the inlet 11. By forming the external circumference of the edge in a stepped manner, with a shoulder 40, against a corresponding step shape in the circumference of the groove 39, there is produced a labyrinth which occurs sufficiently for the water to leak away therethrough as it flows along, certainly if some lubricant, in the form of a suitable grease, is applied therein to facilitate movement and to reduce wear.

In the embodiment according to FIG. 5 and FIG. 6, there is attached to the upper side, on the same central axis 13 of the bearing constructions on the underside, a protrusion 35 which falls in a hole in the upper cover 27 of the distributor device, so that the disc 17 is supported there too without impeding the desired movement.

The protrusion 35 can be hollow in its embodiment and can thus form the discharge of the ventilation 32 of the inverted U 12. The cavity in the upper cover 27 can then be connected to the ventilation system by means of a hose, as described in patent EP 1462040.

The invention claimed is:

1. Distributor (5) for a drink dispensing system with at least two discharge channels (10, 16) which are positioned at the same distance from a central axis (13), parallel to this axis, a supply channel (11) and a distributor member (12, 17, 18) which is rotatable about the axis and has a supply end (12') positioned along the axis and a discharge end (12") which is set radially apart therefrom and can be brought by rotation of the distributor member (12, 17, 18) selectively into fluid connection with the respective discharge channels (10, 16), the liquid supply channel (11) extending along the central axis (13) and along the discharge channels (10, 16), the distributor member comprising a U-shaped connection channel (12) which is placed at the supply end (12') rotatably in the extension of the supply channel (11) and can be placed at the discharge end (12") in fluid connection with the respective discharge channels (10, 16), characterized in that the U-shaped connection channel (12) is fastened to a cylindrical drive wall (18) having a longitudinal axis lying in the extension of the central axis (13), which drive wall is provided along an upper side with teeth which act on a drive member (19, 20) for rotation of the U-shaped connection channel, wherein the U-shaped connection channel (12) is connected to a resilient cavity (26) in a covering cap (27) via a cam (25) positioned along the central axis (3).

2. The distributor (5) according to claim 1, wherein the U-shaped connection channel (12) is provided in proximity to an upper side with a ventilation channel (32) extending through a circumferential wall of the channel (12) in the direction of flow into the U-shaped connection channel (12).

3. The distributor (5) according to claim 1, wherein the U-shaped connection channel (12) is provided with an annular bearing wall (36) having a shoulder (40) which falls in a slot (39) around the supply channel (11), the shoulder resting on an end face of the supply channel.

* * * * *